United States Patent
Yuan

(10) Patent No.: US 10,638,465 B2
(45) Date of Patent: Apr. 28, 2020

(54) METHOD AND SYSTEM OF BI-DIRECTIONAL TRANSMISSION TO IMPROVE UPLINK PERFORMANCE

(71) Applicant: ZTE (USA) Inc., Richardson, TX (US)

(72) Inventor: Yifei Yuan, Iselin, NJ (US)

(73) Assignee: ZTE (USA) Inc., Richardson, TX (US)

( * ) Notice: Subject to any disclaimer, the term of this patent is extended or adjusted under 35 U.S.C. 154(b) by 0 days.

(21) Appl. No.: 15/565,041

(22) PCT Filed: Apr. 8, 2016

(86) PCT No.: PCT/US2016/026570
§ 371 (c)(1),
(2) Date: Oct. 6, 2017

(87) PCT Pub. No.: WO2016/164672
PCT Pub. Date: Oct. 13, 2016

(65) Prior Publication Data
US 2018/0103457 A1    Apr. 12, 2018

Related U.S. Application Data

(60) Provisional application No. 62/144,975, filed on Apr. 9, 2015.

(51) Int. Cl.
| | |
|---|---|
| *H04W 72/04* | (2009.01) |
| *H04W 4/70* | (2018.01) |
| *H04L 1/24* | (2006.01) |
| *H04L 5/00* | (2006.01) |
| *H04W 72/00* | (2009.01) |
| *H04L 1/00* | (2006.01) |

(52) U.S. Cl.
CPC ........... *H04W 72/042* (2013.01); *H04L 1/243* (2013.01); *H04L 5/0026* (2013.01); *H04L 5/0037* (2013.01); *H04W 4/70* (2018.02); *H04W 72/005* (2013.01); *H04L 2001/0093* (2013.01)

(58) Field of Classification Search
CPC ..... H04W 72/04; H04W 72/00; H04W 4/005; H04W 72/005; H04L 5/00; H04L 5/0026
See application file for complete search history.

(56) References Cited

U.S. PATENT DOCUMENTS

| | | | |
|---|---|---|---|
| 8,554,134 B2 * | 10/2013 | So | H04B 7/15521 455/23 |
| 10,021,723 B2 | 7/2018 | Liu et al. | |

(Continued)

FOREIGN PATENT DOCUMENTS

| | | |
|---|---|---|
| EP | 2986075 A1 | 2/2016 |
| WO | WO-2014180160 A1 | 11/2014 |

OTHER PUBLICATIONS

International Search Report for PCT/US2016/026570 dated Jul. 22, 2016.

(Continued)

*Primary Examiner* — Chi Ho A Lee
(74) *Attorney, Agent, or Firm* — Perkins Coie LLP

(57) ABSTRACT

In coverage enhancement of machine type communication (MTC), a downlink transmitted bit stream is jointly encoded with uplink payload by the terminal. The combined signal is sent on uplink, to be jointly decoded by the base station that knows the downlink payload and the joint encoding mechanism at the mobile terminal.

16 Claims, 2 Drawing Sheets

(56) References Cited

U.S. PATENT DOCUMENTS

| | | |
|---|---|---|
| 2007/0184826 A1 | 8/2007 | Park et al. |
| 2008/0049690 A1* | 2/2008 | Kuchibhotla ....... H04L 27/2608 370/338 |
| 2008/0212510 A1* | 9/2008 | Larsson ................. H04L 1/004 370/312 |
| 2009/0046805 A1 | 2/2009 | Kim et al. |
| 2009/0073914 A1 | 3/2009 | Sun et al. |
| 2010/0238824 A1* | 9/2010 | Farajidana ........... H04B 7/0417 370/252 |
| 2010/0322132 A1 | 12/2010 | Ramakrishna et al. |
| 2011/0243012 A1* | 10/2011 | Luo ....................... H04L 5/0055 370/252 |
| 2012/0009963 A1* | 1/2012 | Kim ........................ H04L 5/001 455/509 |
| 2012/0044858 A1* | 2/2012 | Li .......................... H04W 88/04 370/315 |
| 2013/0100911 A1* | 4/2013 | Lv ........................ H04L 1/0026 370/329 |
| 2013/0121271 A1* | 5/2013 | Chen ..................... H04W 72/02 370/329 |
| 2013/0196675 A1* | 8/2013 | Xiao ................... H04W 72/082 455/452.1 |
| 2013/0272148 A1 | 10/2013 | Fong et al. |
| 2014/0010191 A1* | 1/2014 | Nakao ..................... H04L 5/003 370/329 |
| 2016/0212649 A1* | 7/2016 | Chen ..................... H04W 24/10 |
| 2016/0254855 A1* | 9/2016 | Tong ................. H04B 7/18513 370/316 |
| 2016/0366684 A1* | 12/2016 | Kim ....................... H04L 1/0025 |
| 2017/0338877 A1* | 11/2017 | Yum ....................... H04B 7/04 |

OTHER PUBLICATIONS

Written Opinion of the International Searching Authority for PCT/US2016/026570 dated Jul. 22, 2016.

Yuan, Y. et al, "LTE Advanced coverage enhancements," IEEE Comm. Mag., Oct. 2014, pp. 153-159.

Huawei et al., Aspects for the synchronized carrier case, RI-122520, 3GPP TSG RAN WG1 Meeting #69, Prague, Czech Republic, May 12, 2012.

Extended European Search Report for European Application No. 16777328.2, dated Nov. 26, 2018 (8 pages).

* cited by examiner

METHOD AND SYSTEM OF BI-DIRECTIONAL TRANSMISSION TO IMPROVE UPLINK PERFORMANCE

CROSS-REFERENCE TO RELATED APPLICATIONS

This application is a national stage application (under 35 U.S.C. § 371) of PCT/US2016/026570, filed Apr. 8, 2016, which claims benefit of U.S. Application No. 62/144,975, filed Apr. 9, 2015, both of which are incorporated herein by reference in their entirety.

FIELD OF THE INVENTION

The present invention relates to a method and system of bi-directional transmission between a base station and a terminal to improve uplink performance, and to the use of network coding between downlink and uplink.

BACKGROUND OF THE INVENTION

Machine type communication (MTC) is considered as one of the major driving forces of a future generation of cellular communications. Likely application scenarios for MTC feature numerous low-cost machine-type devices connecting to the network. The data packet size of MTC is usually smaller than that of human-to-human cellular communications. Because of the smaller data packet sizes, iterative types of channel codes such as turbo codes or low density parity check (LDPC) codes would provide less coding gain with MTC than is usual with the longer human-to-human packet sizes. To make the matter worse, some types of MTC devices, like meter reading for utilities, are often installed in a basement or other area with poor signal penetration, which requires a superb link budget to overcome the deep penetration loss.

Coverage enhancements can be achieved in several ways. One approach is to use CDMA-like signals that have lower peak to average ratio, less control overhead, etc. A second approach is to use more antennas, either at the transmitter with beamforming or to obtain transmit diversity gain, or at the receiver to obtain aperture or receive diversity gain. A third approach is repetition, which has been used in 3GPP LTE, for the reason that LTE is an OFDMA system and there is no compelling reason to overhaul that fundamental just for the sake of coverage. Note that transmission time interval (TU) bundling enhancements, as described in Y. Yuan, et al, "LTE-Advanced coverage enhancements," IEEE Comm. Mag, October, 2014, pp. 153-159, as one type of repetition, are already specified in Rel-11 LTE for uplink Voice over IP (VoIP) and data traffic carried on physical uplink shared channel (PUSCH). In Rel-12 and Rel-13 LTE, repetition is believed to the most effective technique to achieve good coverage of narrow-band MTC and has been extended to many other physical channels, for example, primary broadcast channel (PBCH), physical downlink shared channel (PDSCH), enhanced physical downlink control channel (EP-DCCH), etc.

Network coding has attracted attention as an academic research topic. Its most promising use scenarios include relay, mesh networks, and device to device (D2D) communications.

Network coding takes advantage of the broadcast nature of wireless communications, and can make use of not-directly targeted transmission(s) to improve the redundancy of transmissions in a coordinated manner.

Significant impact on standards is expected if network coding is to be adopted in LTE. Since the channel coding would remain largely unchanged in LTE/LTE-A, network coding, which inevitably affects the channel codes, has not been studied in 3GPP LTE.

SUMMARY

In accordance with one aspect, there is provided a method of transmitting one or more signals in a downlink message for multiple mobile terminals to receive, and then each terminal, upon successful decoding of one or more of the one or more signals, incorporates information carried in the downlink signals into its own information bits to be sent in an uplink message. The method comprises two processes, performed in the downlink and the uplink, respectively. The first process involves a downlink transmission in which information can be sent from a base station either in broadcast mode or in user-specific mode. The second process concerns the integration between the information sent by the base station and the terminal's own information, to form a jointly coded bit stream for uplink transmission.

In an embodiment, the information carried in the downlink transmission can be common to all the terminals being served by the base station. The common information is sent in the broadcast mode, with the same ID common to all the terminals.

In an embodiment, the information carried in the downlink transmission can be users specific so that different terminals would receive different information. Different terminals may also receive different size payloads of information.

In an embodiment, the user-specific message is transmitted in a dedicated channel, which makes it possible for any or all of the signal format, channel coding and occupied time-frequency-spatial resources targeted to each mobile terminal to be different from others.

In an embodiment, the integration of the downlink information payload and the uplink information payload can result in a combined bit stream of the same size as the original uplink information payload. In that embodiment, the downlink bits are effectively completely absorbed in the uplink bit stream.

In another embodiment, the integration of the downlink information payload and the uplink information payload can result in a combined bit stream of larger size than the original uplink information.

In another aspect, there is provided a system that involves a base station transmitting one or more signals in the downlink for multiple mobile terminals to receive, and then each terminal upon successfully decoding one or more signals, would incorporate the information carried in the downlink into its own information bits to be sent in the uplink. The system implements two processes, performed in the downlink and the uplink, respectively. The first process involves downlink transmission in which the carried information can be sent from base station in either broadcast mode or user-specific mode. The second process concerns the integration between the information sent by the base station, and the terminal's own information, to form a jointly coded bit stream for uplink transmission.

In another aspect, there are provided terminals, base stations, computer programs and other machine-readable instructions, and non-volatile computer-readable storage media containing such instructions, for putting the methods and systems into effect.

The foregoing and other features and advantages will become more apparent in light of the following detailed description of preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE FIGURES

The above and other aspects, features, and advantages of the present invention may be more apparent from the following more particular description of embodiments thereof, presented in conjunction with the following drawings. In the drawings.

DETAILED DESCRIPTION

A better understanding of various features and advantages of the present methods and devices may be obtained by reference to the following detailed description of illustrative embodiments of the invention and accompanying drawings. Although these drawings depict embodiments of the contemplated methods and devices, they should not be construed as foreclosing alternative or equivalent embodiments apparent to those of ordinary skill in the subject art.

Figure 1:
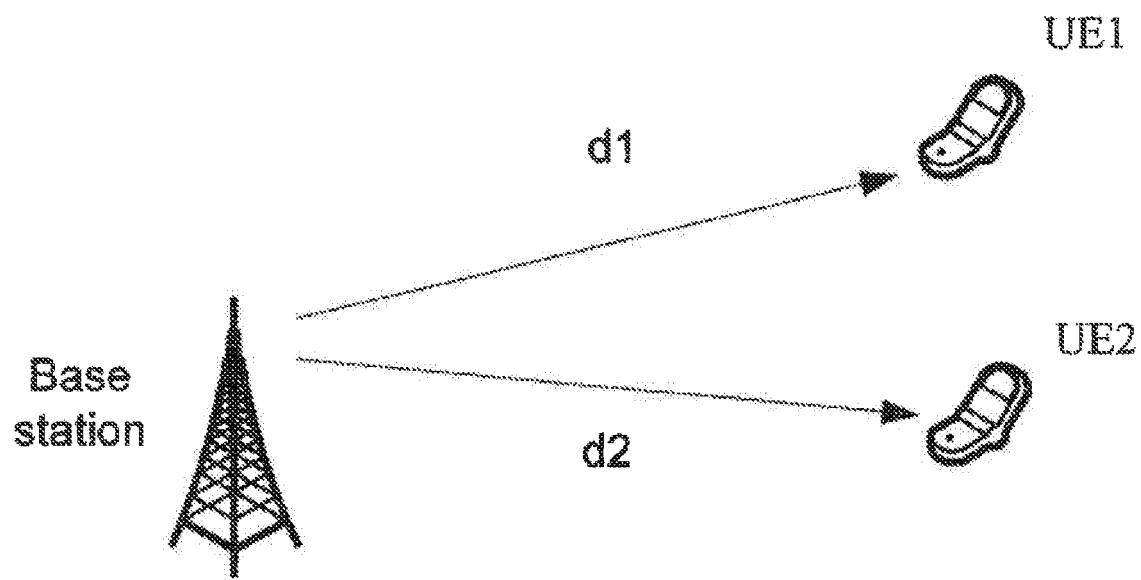
FIG. 1 illustrates the downlink stage.
Figure 2:
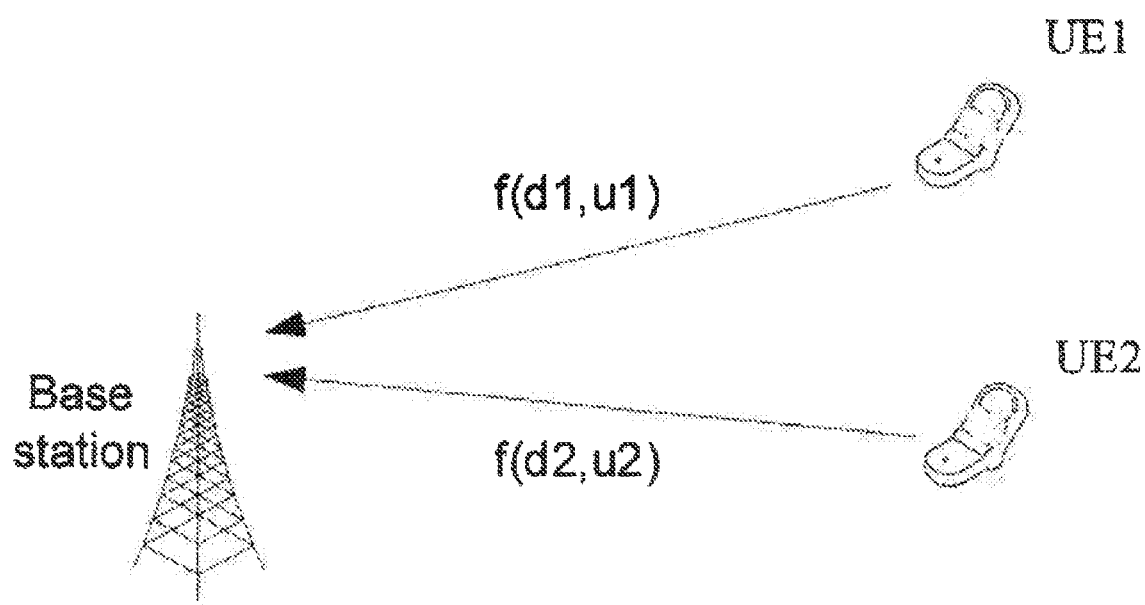
FIG. 2 illustrates the uplink stage.

Referring to the accompanying drawings, and initially mainly to FIGS. 1 and 2, there is illustrated an example of integrating downlink bearing bits and an uplink payload and jointly encoding the downlink bits and the uplink bits to form a combined bit stream to be sent in the uplink.

The present method and devices apply a principle of network coding where bit streams coming from different nodes can be added together to improve the overall system capacity. Such principle is particularly applied in a scenario of machine type communication (MTC) where coverage requirements can be very challenging, especially for an uplink that is limited by the maximum transmitting power and the number of antennas at the terminals. The situation can be aggravated because uplinking terminals may be devices such as utility meters installed in basements, from which good transmission is difficult to obtain. The situation of the downlink tends to be less difficult, because the base stations can easily have higher transmitting power and a larger number of antennas than the terminals. Hence, some link budget imbalance between downlink and uplink can be compensated by jointly decoding the downlink and uplink signals.

In the example shown in FIGS. 1 and 2, only two terminals are shown, in the form of mobile stations denoted as user equipment UE1 and UE2, respectively. However, there may be more or fewer terminals, and some or all of the terminals may be stationary rather than mobile.

Figure 3:
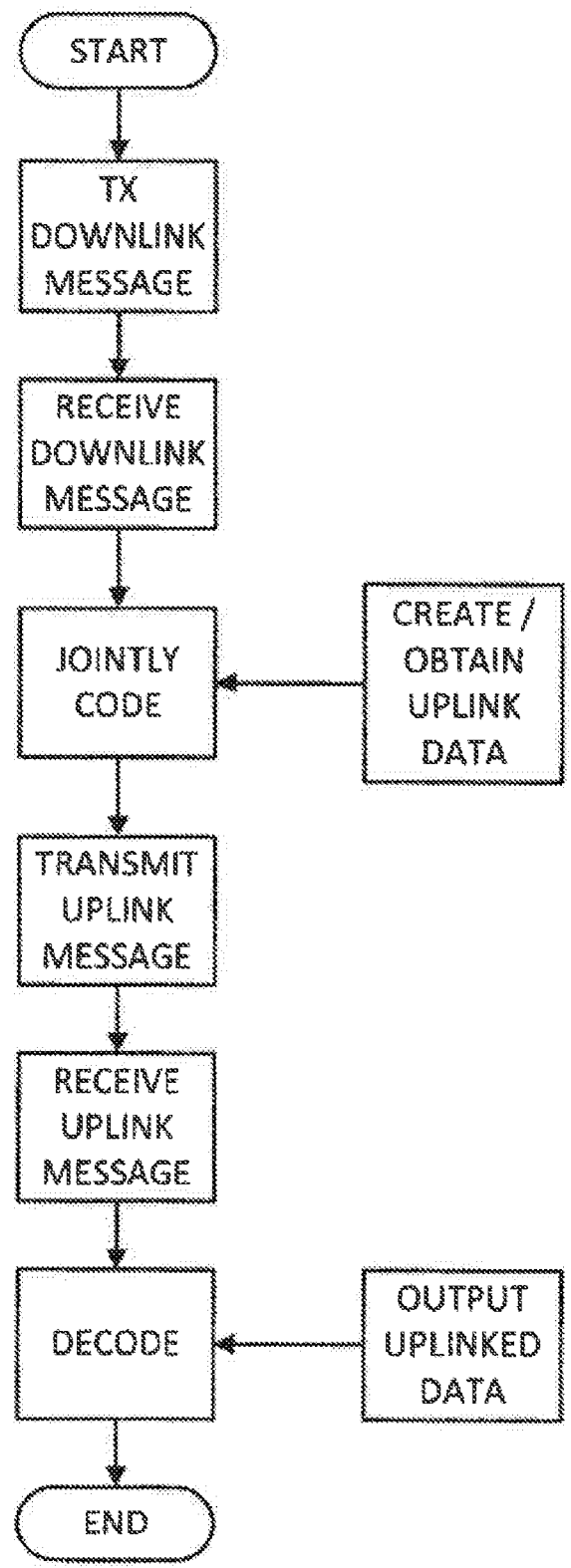
FIG. 3 is a flowchart.

Referring now also to FIG. 3, during a downlink transmission stage, the base station sends signals bearing information bit streams d1 and d2 to terminals UE1 and UE2, respectively. These two streams can in general be different, which means that they can be encoded and modulated with different code rates and modulation order, and then transmitted to each HE with dedicated resources. This provides the freedom to adjust the downlink transmission payload individually to each mobile station. Since uplink quality of each mobile station may be different, the optimum size and content of the downlink payload to participate the joint coding may be different for different uplink connections.

Alternatively, bit streams d1 and d2 can be the same, so that the base station can broadcast to both UE1 and UE2, using the code rate, modulation, and radio resources common to them. While the broadcast transmission has less flexibility in controlling the downlink data rate per link, it has less overhead and may be preferable in some scenarios. In a larger system with many terminals UE1, UE2, . . . , some or all of the terminals may be organized in groups with a common transmission to all the terminals in a group, and different transmissions to terminals not in the same group.

When a terminal UE1 or UE2 successfully decodes the respective bit stream d1 or d2, the terminal then encodes its own uplink payload, u1 or u2, respectively, jointly with the respective downlink payload d1 or d2, to form an uplink payload f(d, u). The joint coding can be a type of network coding. A very simple of such joint coding can be an "exclusive or" operation on each bit of "d" and "u". In this case, the length of "d" used in the coding is the same as the length of "u". Consequently, the jointly coded bit stream has the same length as the terminal's own uplink payload. If the length of the uplink payload is known in advance, then a downlink payload "d" of the correct length may be supplied. Alternatively, or if a common downlink payload is used by two or more terminals having uplink payloads of different lengths, the downlink payload may be truncated or repeated to provide a bit stream of the correct length. Alternatively, a more sophisticated joint coding may be used and the resulted bit stream may be longer than the mobile's own uplink payload.

At the base station's receiver, the uplink message is decoded. The decoder takes account of the downlink transmitted bit stream "d", which is of course already known to the decoder. The decoder also uses the knowledge of the joint coding mechanism at the terminal's transmitter, which is agreed in advance or specified in the air-interface specifications. The decoding is then performed in joint manner, where "d" also participates the decoding of "u".

Many modifications and alterations of the methods and systems described herein may be employed by those skilled in the art without departing from the spirit and scope of the invention which is limited only by the claims.

The invention claimed is:

1. A method of operating a communication terminal, comprising:
   receiving from a base station, a downlink message including downlink payload information, wherein the downlink payload information is common to a plurality of terminals served by the base station, and sent in a broadcast mode, with a destination ID common to all the plurality of terminals,
   encoding uplink payload information to be sent in an uplink message to the base station jointly with at least some of the downlink payload information received in the downlink message; and
   sending to the base station a message including the jointly encoded information.

2. The method of claim 1, wherein the downlink payload information is user-specific to the individual terminal.

3. The method of claim 1, wherein the jointly encoding comprises performing a bitwise "exclusive or" operation on the downlink payload information and the uplink payload information.

4. A communication terminal, comprising:
   a receiver operative to receive, from a base station, a downlink message including downlink payload information sent in a broadcast mode with a destination ID common to a plurality of terminals;

an encoder operative to encode uplink payload information to be sent in an uplink message to the base station jointly with at least some of the downlink payload information received in the downlink message; and a transmitter operative to send to the base station a message including the jointly encoded information.

5. The terminal of claim 4, which is configured to receive the downlink payload information user-specific to the individual terminal.

6. The terminal of claim 4, wherein the encoder is configured to perform the jointly encoding by performing a bitwise "exclusive or" operation on the downlink payload information and the uplink payload information.

7. A method of communication comprising, at a base station:

transmitting, to at least one terminal, a downlink message including downlink payload information, wherein the downlink payload information comprises common downlink payload information sent to a plurality of terminals served by the base station, in a broadcast mode, with a destination ID common to all the plurality of terminals;

receiving from the at least one terminal an uplink message containing uplink payload information from the terminal to the base station encoded jointly with at least some of the downlink payload information sent in the downlink message; and decoding the uplink message using the downlink payload information and extracting the uplink payload information.

8. The method of claim 7, wherein the transmitting comprises sending user-specific downlink payload information to individual ones of a plurality of said terminals.

9. The method of claim 8, wherein at least one of a payload size, a signal format, a channel coding and occupied time-frequency-spatial resources are different for the user-specific downlink payload information sent to different terminals.

10. The method of claim 7, wherein the jointly encoding comprises performing a bitwise "exclusive or" operation on the downlink payload information and the uplink payload information.

11. The method of claim 7, further comprising, at a terminal:

receiving the downlink message;

encoding uplink payload information to be sent in the uplink message to the base station jointly with at least some of the downlink payload information received in the downlink message; and sending to the base station the message including the jointly encoded information.

12. A base station, comprising:

a transmitter configured to transmit, to at least one terminal, a downlink message including downlink payload information, wherein the downlink payload information comprises common downlink payload information sent to a plurality of terminals served by the base station, in a broadcast mode, with a destination ID common to all the plurality of terminals;

a receiver configured to receive from the at least one terminal an uplink message containing uplink payload information from the terminal to the base station encoded jointly with at least some of the downlink payload information sent in the downlink message; and a decoder configured to decode the uplink message using the downlink payload information and to extract the uplink payload information.

13. The base station of claim 12, wherein the transmitter is configured to send user-specific downlink payload information to individual ones of a plurality of said terminals.

14. The base station of claim 13, wherein the transmitter is configured to send the user-specific downlink payload information with at least one of a payload size, a signal format, a channel coding and occupied time-frequency-spatial resources different for the user-specific downlink payload information sent to different terminals.

15. The base station of claim 12, wherein the decoder is configured to decode said uplink messages in which the downlink payload information and the uplink payload information are jointly encoded by performing a bitwise "exclusive or" operation on the downlink payload information and the uplink payload information.

16. The base station of claim 12, in combination with at least one communication terminal, comprising:

a receiver operative to receive the downlink message from the base station;

an encoder operative to encode uplink payload information to be sent in an uplink message to the base station jointly with at least some of the downlink payload information received in the downlink message; and a transmitter operative to send to the base station a message including the jointly encoded information.

* * * * *